United States Patent [19]

Aoki et al.

[11] 4,403,155

[45] Sep. 6, 1983

[54] WIRING SYSTEM FOR AUTOMOTIVE VEHICLES

[75] Inventors: Hideto Aoki; Tomoyuki Hirano; Mitsugu Watanabe; Toshiyuki Kamano; Mitsunori Tsunoda; Toshikazu Akiyama; Mitsuyasu Kanehiro; Mitsuji Kubota; Masayuki Sato, all of Kosai, Japan

[73] Assignee: Yazaki Corporation, Tokyo, Japan

[21] Appl. No.: 342,430

[22] Filed: Jan. 25, 1982

Related U.S. Application Data

[63] Continuation of Ser. No. 112,859, Jan. 17, 1980, abandoned.

[51] Int. Cl.³ .............................................. H02G 3/00
[52] U.S. Cl. ................................................. 307/10 R
[58] Field of Search .................. 339/147 R, 10 P, 11; 361/331, 351, 428; 307/10 R, 10 LS, 11

[56] References Cited

U.S. PATENT DOCUMENTS

| | | | |
|---|---|---|---|
| 2,975,297 | 3/1961 | O'Neil | 307/10 R |
| 2,994,001 | 7/1961 | Moorhead | 307/10 R |
| 3,697,767 | 10/1972 | Fioravanti | 307/10 R |
| 3,864,578 | 2/1975 | Lackey | 307/10 R |
| 4,122,357 | 10/1978 | Sumida | 307/10 R |
| 4,221,455 | 9/1980 | Cairns et al. | 339/147 R X |

Primary Examiner—Donald A. Griffin
Attorney, Agent, or Firm—Lackenbach, Siegel, Marzullo, Presta & Aronson

[57] ABSTRACT

An improved wiring system is provided in which a connector box having a plurality of terminals, electrical circuitry, and bus bars is incorporated. Since each bus bar provides forked conductive paths between the circuitry and the terminals, the terminals of the connector box and outside connectors can be connected by way of wires in a one-to-one correspondence. This simplified wiring mode greatly reduces manual labor in the manufacture of wire harnesses. Moreover, if a plurality of connector boxes of such structure as above are provided, they can be arranged in the vicinity of any of the electrical equipment of the vehicle due to their compact structure, thus minimizing the arrangement of power line wires in the car body.

3 Claims, 10 Drawing Figures

Prior Art

FIG. 10

WIRING SYSTEM FOR AUTOMOTIVE VEHICLES

This is a continuation of application Ser. No. 112,859, filed Jan. 17, 1980 and now abandoned.

BACKGROUND OF THE INVENTION

The present invention relates to electric wiring systems for automotive vehicles, and more particularly, to a wiring system characterized by a minimal branching connection of wires to intermediate portions of other wires which permit simplification in the mode of wiring and in the steps of connecting, thus promoting ready production, inspection, repair and other procedures on wire harnesses.

Among known electric wiring systems for automotive vehicles, the predominant systems lays a first group of wires and then connects a second group of wires or subwires to the first group of wires to form branches. This method is to minimize the length of wiring, to facilitate ready handling necessary for various electrical units whose positions in a vehicle are substantially limited in view of their functions. Switches for ON-OFF controlling the electrical equipments are usually mounted on an instrument panel. For all of these reasons, a concentrated and massive arrangement of numerous wires of a vehicle is unavoidable around the instrument panel of the vehicle.

There is an increasing tendency in automotive vehicles to provide a larger number of electrical units designed to enhance safety to ease driving, and to ensure a comfortable ride and efficient manipulation of the controls. Some cars employ electronic fuel injectors and/or electronic engine control systems for reliability of engine control. Safety measures may be typified by fuses which are mounted in separate locations for individual loads and in trouble shooting and alarm devices for checking the various electrical conditions of the vehicles. Yet another modern demand is for automatic air conditioning systems and automatic drive systems to improve riding qualities. Such a tendency is reflected by a multi-branch wiring which grows more and more complicated.

Meanwhile, the increasing number of electrical units and the circuits necessary for the connection thereof requires more space in the car which, with today's smaller cars, has little room for such bulk.

The predominant wiring system involves multi-branch connections of subwires to main wires by manual labor. This seriously obstructs the efficient production of wire harnesses, and, wire harnesses using such a system require a disproportionate amount of time and labor for inspection and repair when damage occurs; and the quality and reliability of wire harnesses are limited.

SUMMARY OF THE INVENTION

The present invention overcomes the shortcomings as discussed above in connection with the prior art.

Accordingly, it is an object of the present invention to provide a wiring system which promotes production on a quantity basis by mechanization and which may be fully automated.

Another object of the present invention is to provide a wiring system which simplifies the wiring form and connecting step of wire harnesses by connecting loads, switches and other electrical equipment of an automobile in a one-to-one correspondence by wires through terminals so as to reduce the number of the branching connections.

Still another object of the present invention is to provide a wiring system in which plural connector boxes with desired circuit elements each including fuses, and relays are located in suitable positions in an automobile to simplify the wiring form and connecting step of wire harnesses and to obtain a decrease in the number of wires which in turn reduces the weight of the entire wire harnesses and connector boxes.

A further object of the present invention is to provide a wiring system which offers improved realiability, and constant quality for installed wire harnesses while permitting them to be inspected and repaired with ease in the event of damage.

In one aspect of the present invention, there is essentially provided a wiring system for an automative vehicle comprising a connector box having therein a plurality of circuit elements and a plurality of bus bars, at least one of said bus bars providing branched conductive paths, selected members of said branched conductive paths being associated with said circuit elements and the remaining members of said branched paths being adapted for outside connection; and a plurality of connectors each having at least one terminal, and said remaining members for outside connection being connected to said terminal by wires in a one-to-one correspondence.

With this wiring system, time and labor needed for conventional branching connection are markedly reduced while automatic procedures can readily be promoted for the cut-off and baring of wires and clamping and fixing of metal terminals on the wires. Additionally, wire harnesses can be laid in simple form and connected by a simple step.

More specifically, the traditional multi-branch connection needs manual work for various procedures including (i) removing insulating covers from intermediate portions of main wires to get their conductors exposed, (ii) peeling one end of subwires as in the step (i), (iii) winding the now uncovered conductors of the subwires on the naked intermediate portions of the main wires, (iv) jointing them as by soldering if necessary and (v) insulating the joint portions of the main and subwires by means of a glass tape or a vinyl tape. According to the system of the invention claimed, such steps relying on manual work can substantially be eliminated to readily promote the automatic production of wire harnesses.

In another aspect, the present invention provides a wiring system for an automotive vehicle comprising a plurality of connector boxes each having therein a plurality of circuit elements and a plurality of bus bars, at least one of said bus bars providing branched conductive paths, selected members of said branched conductive paths being associated with said circuit elements and the remaining members of said branched conductive paths being adapted for outside connection; and a plurality of connectors each having at least one terminal, said remaining members for outside connection being divided into a plurality of groups, said groups including first and second groups, members of the first group in each connector box being connected to the terminal of selected members of said connectors by wires in a one-to-one correspondence, and members of the second group in each connector box being connected to members of the second group in any one of other connector boxes by wires in a one-to-one correspondence.

With this wiring system, each of the electrical units can be connected with the nearest one of the multiple connector boxes. The resultant decrease in number and length of necessary wires leads to a simple form of wiring and a simple step of connection, as well as to a decrease in the overall weight of each wire harness including the connector boxes.

Wire harnesses with such simple wiring mode and connecting step attain improved reliability and stability in quality. The connector boxes suitably located each with fuses as stated above allows the wire harnesses to be inspected and repaired quite easily.

DETAILED DESCRIPTION OF THE PREFERRED EMBODIMENTS

The present invention will hereinafter be described in detail with reference to the accompanying drawings.

Figure 1:
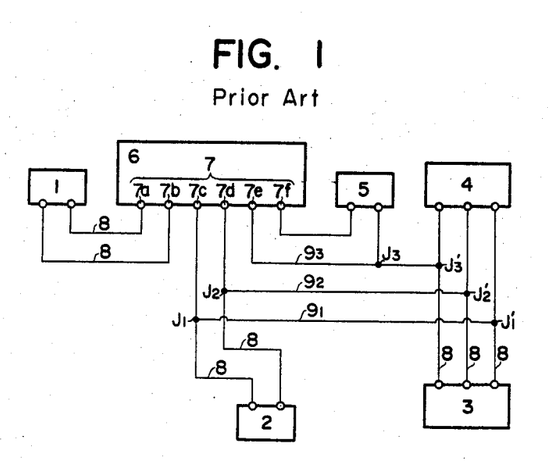
FIG. 1 is a diagram showing a conventional or prior art wiring system.

Referring to FIG. 1, the known prior art wiring system is shown as including connectors 1, 2, 3 and 4 connected to electrical equipment of the vehicle including switches or electrical loads, a fuse box 5, and a switch box 6 adapted to actuate the electrical equipment of the automotive vehicle.

A number of terminals $7a$ to $7f$ generally designated by the reference numeral 7 are provided to the switch box 6. Likewise, a necessary number of terminals are carried by each of the connectors 1 to 4 and fuse box 5. Through these terminals, two wires 8 couple the switch box 6 to each of the connectors 1 and 2 and fuse box 5 on the basis of a one-to-one correspondence, while three wires 8 establish the connection of the connectors 3 and 4 to each other also on a one-to-one basis.

Furthermore, the three wires 8 joining the connectors 3 and 4 together are connected to the wires 8 allotted to the switch box 6 and fuse box 5 by two auxiliary wires or subwires $9_1$ and $9_2$ and one subwire $9_3$, respectively. The opposite ends of the subwires $9_1$ to $9_3$ therefore necessarily have branching junctions $J_1$, $J_1'$ and $J_2$, $J_2'$ and $J_3$, $J_3'$. This type of wiring system can not avoid a complex wiring form and connecting step of wire harnesses, thus incurring an increase of cost in the production line of wire harnesses.

Figure 2:
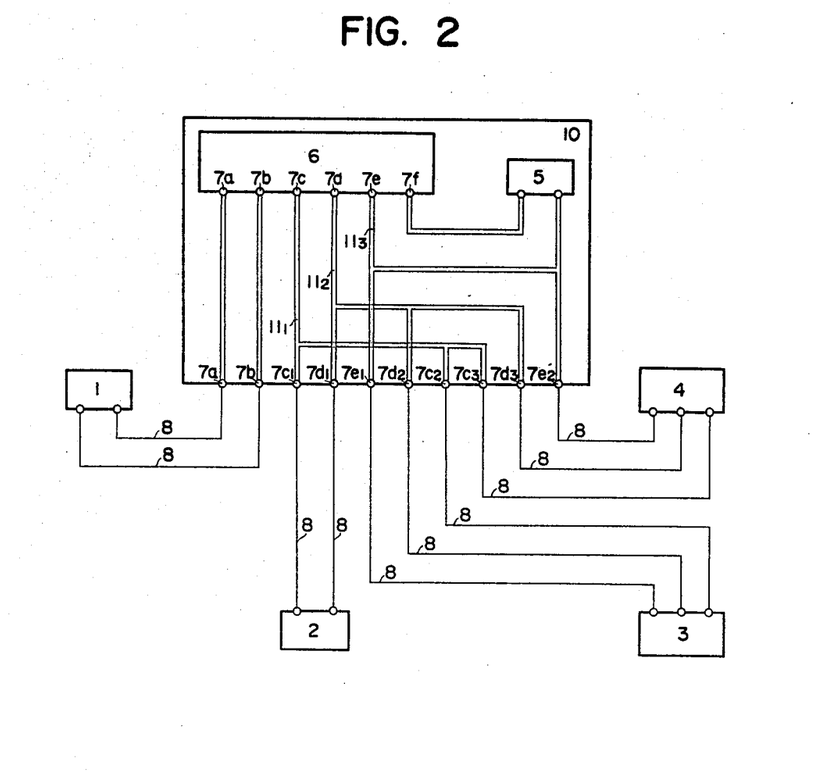
FIG. 2 also shows in diagram form a first embodiment of the wiring system made in accordance with the present invention.

A first embodiment of the wiring system according to the present invention is illustrated in FIG. 2.

The reference numeral 10 in FIG. 2 denotes a connector box which has accommodated therein the fuse box 5 accomodating therein a fuse circuit, a control circuit and a relay circuit and switch box 6 accommodating therein a switch circuit as in integral unit. The switch box 6 has terminals $7a$ to $7f$ constituting the terminal array 7. Of these terminals, the terminal $7c$ is branched into three terminals $7c_1$, $7c_2$ and $7c_3$ through a bus bar circuit $11_1$. Likewise, the terminal $7d$ is provided with three terminals $7d_1$, $7d_2$ and $7d_3$ by a bus bar circuit $11_2$ while the terminal $7e$ with two terminals $7e_1$ and $7e_2$ has a bus bar circuit $11_3$.

In other words, the connector box 10 is furnished with all the terminals needed for its connection with the respective connectors 1 to 4. Other terminals are joined together through the bus bars $11_1$ to $11_3$.

Each of the bus bars $11_1$, $11_2$, $11_3$ provides branched conductive paths. For example, bus bar $11_3$ has four branched conductive paths, two of which are associated with circuit elements accommodated in the fuse box 5 and switch box 6 and the remaining two paths are adapted for outside connection.

Connectors 1 to 4 may have a bus bar therein.

Figure 3:
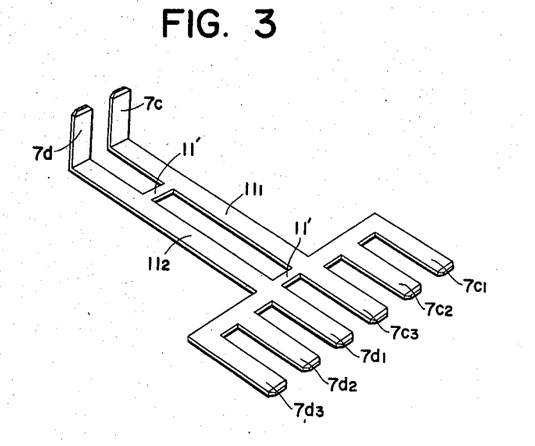
FIG. 3 is a perspective view of a bus bar generally used in the wiring system of the present invention.

A manufacturing procedure of these bus bar circuit $11_1$ and $11_2$ will be explained hereinafter referring to FIG. 3. The integral member shown is punched from a sheet of copper or brass and press formed into the depicted shape. Connections 11' joining the bus bar circuits $11_1$ and $11_2$ are severed to form two separate bus bar circuits $11_1$ and $11_2$.

Consequently, the connector box 10 and each of the connectors 1 to 4 are connected by wires in a one-to-one relation.

It will therefore be understood that the wiring system of this invention minimizes or totally removes the conventional branches relying on subwires and thus the junctions $J_1$, $J_1'$, $J_2$, $J_2'$, $J_3$, and $J_3'$. This simplifies the wiring mode in the car and connecting step of wire harnesses used for such a wiring mode. Another outstanding advantage resides in the reduction of necessary wires. While the conventional connection shown in FIG. 1 needs twelve wires inclusive of the subwires $9_1$ to $9_3$, ten wires in total should suffice for the connection of FIG. 2 embodying the invention.

Figure 4:
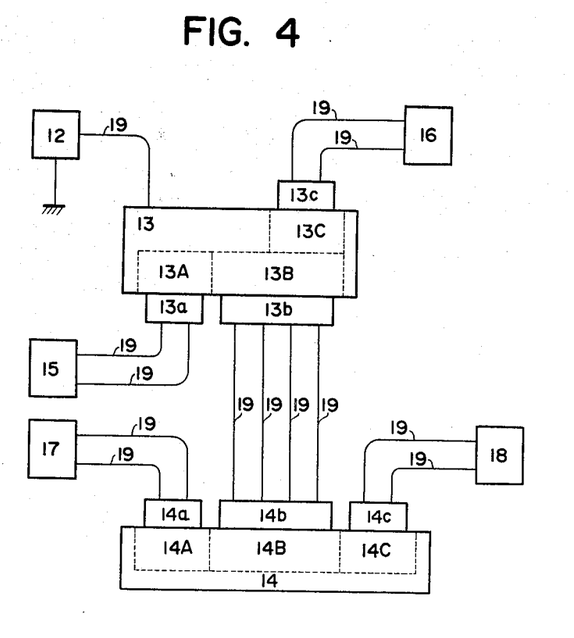
FIG. 4 illustrates in diagram form a second embodiment of the wiring system made in accordance with the invention.

Another embodiment of a wiring system according to the invention is depicted in FIG. 4.

The wiring system of FIG. 4 includes a battery 12, a main connector box 13, an auxiliary or subconnector box 14 and connectors 15, 16, 17 and 18 connected to electrical equipment including switches or electrical loads. Wire harnesses 19 couple the main and subconnector boxes 13 and 14 to each other and with the connectors 15-18 in the manner described in connection with the first embodiment. As discussed hereinafter, each wire harness 19 comprises a number of individual wires combined together into an integral bundle and each having no branching junctions.

Desired electric circuit units 13A to 13C are mounted in the connector box 13 and desired electric circuit units 14A to 14C in the connector box 14. Each of these circuit units may include various elements as typified by a fuse circuit, a control circuit, a relay circuit, a flasher circuit and circuits for connection with unit loads of a vehicle, switches and other connectors. Auxiliary or subconnectors 13a to 13c and 14a to 14c are associated with the connector boxes 13 and 14, respectively, in correspondence with the circuit units.

Figure 5:
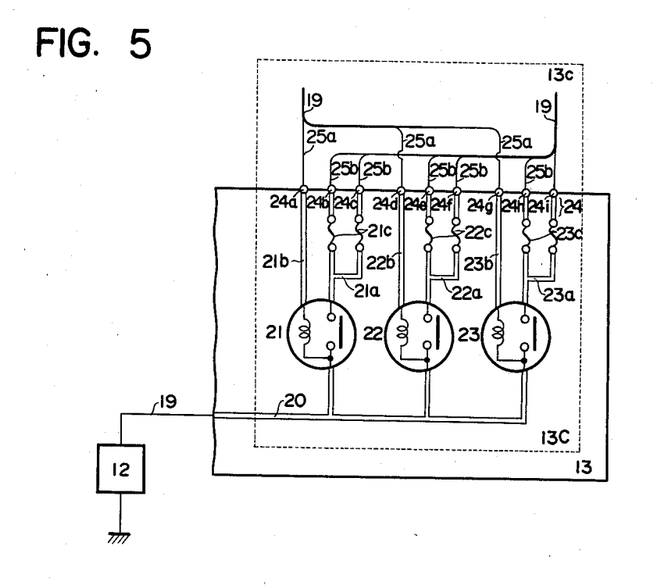
FIG. 5 illustrates the details of an electric circuit unit 13C included in the wiring system of FIG. 4.

Detailed connection inside the associated circuit unit 13C and subconnector 13c of the connector box 13 is illustrated in FIG. 5 by way of example.

Referring to FIG. 5, a wire 19 is connected at one end with the battery 12 and at the other end with a bus bar circuit 20 which is in turn branched into a connection with relays 21, 22 and 23. The load circuits of the respective relays 21 to 22 bifurcate through bus bars to form branched circuits 21a to 23a, each having a pair of fuses 21c, 22c, or 23c. Terminals 24a to 24i generally denoted by the reference numeral 24 are installed in a correspondence with the branched circuits 21a to 23a and to signal circuits 21b to 23b of the relays 21 to 23.

In the subconnector 13c, a set of first wires 25a and a set of second wires 25b are connected directly with the terminals 24a to 24i of the circuit unit 13C and bundled together to constitute a wire harness 19. Through the subconnector 13c, the wire harness 19 is mounted in a body so as to be readily attachable and detachable.

Although FIG. 4 shows only two connector bases 13 and 14, it is allowed to provide any number of connector boxes each for connection with any one of the other connector boxes and for connection with a plurality of connectors by wires in a one-to-one correspondence.

As seen in FIG. 4, each of the connectors 15–18, as the connectors 1 to 4, is furnished with a number of terminals for selective connection with the various electric elements of a vehicle such as various loads and switches. The connectors 15 to 18 may include therein a bus bar providing branched conductive paths for a fuse circuit, and relay circuits.

Figure 6:
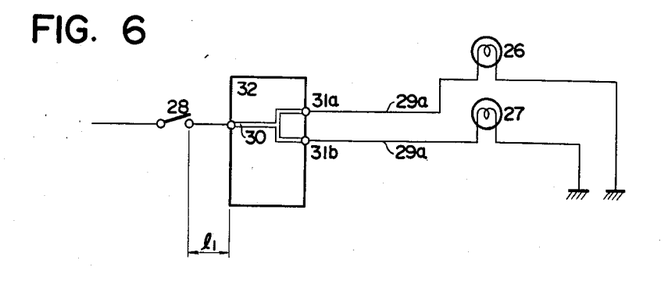
FIG. 6 is a wiring diagram showing one modification of the present invention.
Figure 7:
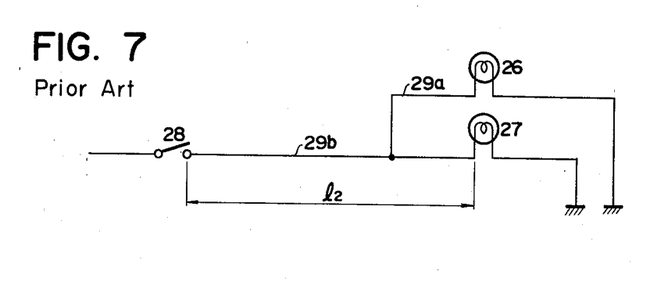
FIG. 7 is a wiring diagram showing a prior art wiring.

FIG. 6 is a wiring diagram showing a simple application of the first embodiment of the present invention, whereas FIG. 7 is a conventional counterpart.

Referring now to FIG. 7, wires 29a connected to a head lamps 26 and 27 are branched off from a wire 29a connected to switch 28.

This arrangement has a drawback that a standard wire specific to the head lamp 27 is too fine to be used for the wire 29b; that is, such a wire must be replaced by a thicker wire. Moreover, the wire length $l_2$ becomes unnecessarily long. The present invention eliminates this drawback. Referring to FIG. 6, the connector box 32 accomodating a branched circuit 30 and terminals 31a and 31b connected thereto permits the use of a fine wire 29a as specified for the head lamps 26 and 27, thus eliminating the above-mentioned drawback. Moreover, the wire length $l_1$ can be reduced by properly arranging this compact connector box in the vicinity of the head lamps.

Figure 8:
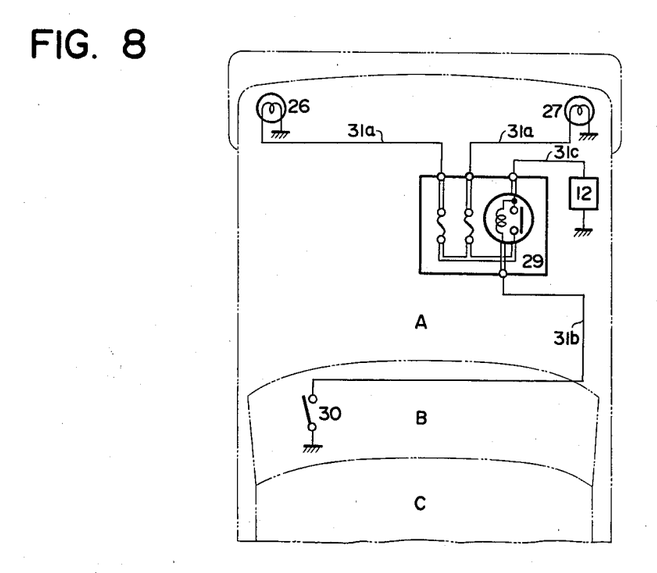
FIG. 8 demonstrates an application of the first embodiment of a wiring system made in accordance with the invention.

FIG. 8 is a schematic diagram representing a simple application of the wiring system according to this invention. A conventional wiring system corresponding to FIG. 8 is shown in FIG. 9 for comparison.

Figure 9:
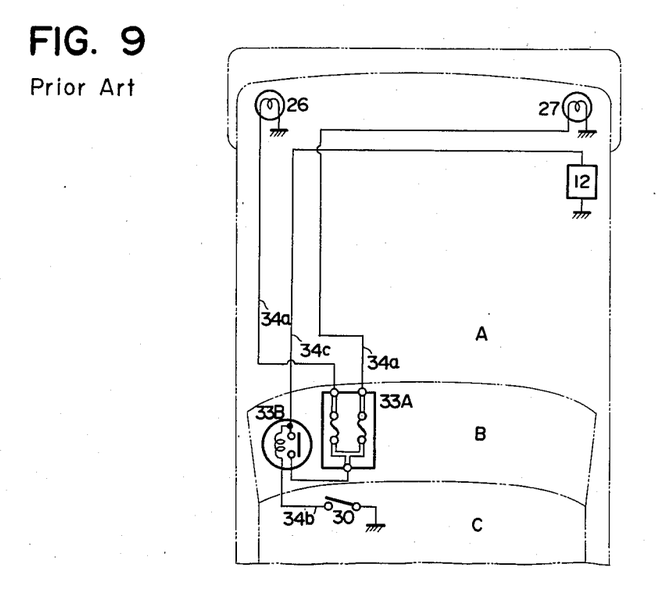
FIG. 9 depicts a conventional or prior art wiring system corresponding to FIG. 8.

Illustrated in each of FIGS. 8 and 9 is a front portion of an automotive vehicle which includes an engine compartment A, instrument panel B, and a passenger compartment C. In FIG. 8, a connector box 29 with a relay and fuses is coupled with a battery 12 fixed in place within the engine compartment A. Two wires 31a connect the load circuit of the left and right head lamps 26 and 27, whereas one wire 31b connects the signal circuit with a switch 30 on the instrument panel B. Thus, the head lamps can be wired quite easily to the switch 30. Additionally, a wire 31c for the power supply from the battery 12 to the connector box 29 need not extend to the instrument panel B.

Referring to FIG. 9, the conventional wiring system for head lamps 26 and 27 includes fuses 33A and a relay 33B which occupy separate locations in the neighborhood of the instrument panel B. This type of system can not avoid the arrangement of two wires 34a for load circuits, one power supply wire 34c and a signal circuit 34b concentrating around the instrument panel B, necessitating a disproportionate length of wiring. Another drawback resides in that, since the three wires 34a and 34c extending to the instrument panel B have large current capacities, they are quite liable to bring about secondary accidents when snapped or short-circuited for example.

Figure 10:
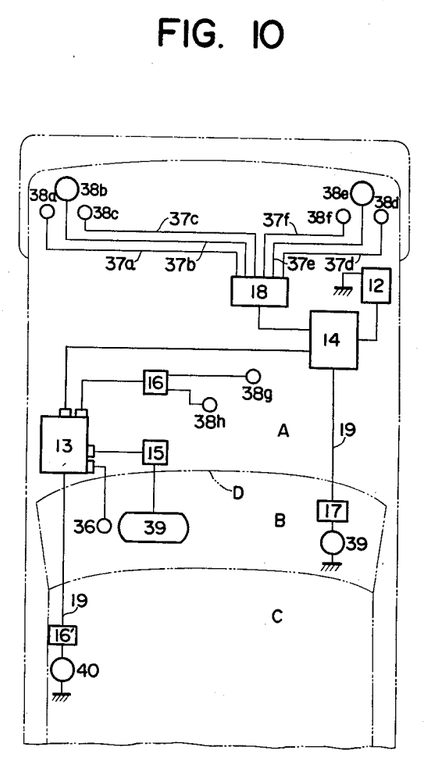
FIG. 10 shows an application of the second embodiment of the wiring system made in accordance with the invention.

FIG. 10 shows an automotive engine compartment demonstrating another application of the present invention. In FIG. 10, component parts and elements common to those of FIG. 4 are designated by the same reference numerals and characters.

A switch box 35 and an ignition key 36 are provided to the instrument panel B while the battery 12 is installed in a right front portion of the engine compartment. A main connector box 13 is positioned on the left of a cowl side D and a subconnector box 14 in the vicinity of the battery 12. These connector boxes 13 and 14 are connected to each other by a wire harness 19 extending in a front portion from the left to the right side of the engine compartment A.

A circuit unit 14c (not shown in FIG. 10) associated with the subconnector box 14 has fuses and relays connected in the same way as those shown in FIG. 5. A load circuit of the circuit unit 14c is coupled through a connector 18 and individual wires 37a to 37f to left and right side turn lamps 38a and 38d, head lamps 38b and 38e, and front side lamps 38c and 38f. A signal circuit of the circuit unit 14c is connected to the switch box 35 via connector 15 associated with the main connector 13. A starter 38g and an ignition coil 38h are commonly connected with the ignition key 36 through connector 16 and main connector box 13 by wiring harnesses 19 each comprising a bundle of individual wires.

Furthermore, a wiring harness 19 extending along the right side of the engine compartment A provides the connection between a connector 17, the parking lamps and like loads 39. A further connector 16' is coupled with another group of loads 40 such as tail lamps, hazard warning signal flasher and defogger through a wire harness extending to the left rear of the passenger compartment C.

In the above construction, only two connector boxes are provided but with the invention, it is allowed to provide any number of connector boxes. The electrical equipment of the vehicle includes switches or electrical loads such as lamp 38a to 38f, which are divided into a plurality of groups taking into account the positions for their installation. Therefore, each of such connector boxes can be arranged in association with selected one of the groups. In FIG. 10, the main and auxiliary connector boxes 13 and 14 may occupy any desired position in a motor vehicle while the number of connectors 15-18 coupled with the connector boxes is open to choice. As will now be apparent from FIGS. 4 and 10, a wiring system according to the present invention features various advantages as enumerated below.

(1) Connector boxes each having a circuit unit with fuses and like elements are located in separate positions. This avoids the cowl side installation of wiring harnesses which are directly connected to loads without passing through fuses, thus preventing fires which might result from collision or short-circuiting.

(2) Such separate locations of connector boxes promote a decrease in the number of wire harnesses conventionally concentrated in the neighborhood of the instrument panel while, at the same time, facilitating an easy and simple mode of wiring.

(3) Connector boxes and connectors are equipped with groups of terminals inclusive of multiple branched circuits so that connector boxes, connectors, various loads and switches can be connected each directly by individual wires dispensing with the traditional branched connection.

(4) Manufacturing costs are reduced by using the present invention.

(5) Large bunches of branched connected wires and/or wire harnesses are substantially eliminated. Consequently, the wiring becomes simple in form and the connecting work easy with the resultant reduction in the number of working steps. The wiring harnesses with hardly any junctions for branching can be inspected, repaired and replaced with ease in the event of damage.

(6) The wiring system of the invention can cope with the current trend to a larger number of electric units mounted in a motor vehicle. This is attainable, for example, by accommodating a stratiform assembly of multiple circuit boards in the main and/or auxiliary connector box and providing a number of electric circuit units therewith in a concentrated manner.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A wiring system for a motor vehicle having a battery in a front portion of an engine compartment, comprising:
a plurality of connector boxes including main and auxilliary connector boxes; a plurality of conductors; each connector box having a plurality of bus bars, at least one selected bus bar providing branched conductive paths and the remaining bus bars providing straight conductive paths; at least one of said plurality of connector boxes having therein a plurality of circuit elements, and said plurality of circuit elements being connected to the bus bars in said at least one connector box; said main and auxilliary connector boxes providing connectors in a one-to-one correspondence between members of a first selected group of said branched and straight conductive paths to each other, and said plurality of connectors and said plurality of connector boxes providing connections in a one-to-one correspondence between said connectors and members of a second selected group of said branched and straight conductive paths in each connector box; a first member of said plurality of connector boxes being positioned in the vicinity of said battery, and a member of a third selected group of said branched and straight conductive paths of said first connector box being connected to said battery, and said circuit elements in said first box of said plurality of connector boxes providing a load circuit connection within said front portion of the engine compartment; and members of said first selected group of said plurality of connectors being connected via a second of said connector boxes to switches in an instrument panel of said motor vehicle; whereby a minimum number of wires are employed in interconnecting the circuitry on one portion of said motor vehicle with the circuitry in another portion thereof, and whereby the wires conducting large current are arranged away from the vehicles' driver for optimum safety.

2. A wiring system for a motor vehicle having a battery in the front portion of an engine compartment, comprising:
a plurality of connector boxes, each of said boxes having a plurality of bus bars, at least one of said bus bars providing branched conductive paths; electric wires providing connections in a one-to-one correspondence between terminals of individual ones of said bus bars in respective ones of said boxes; a first member of said plurality of said connector boxes being positioned in the vicinity of said battery; a selected member of said bus bars in said first member being connected to said battery while the remaining members of said bus bars providing a load circuit connection within said front portion of the engine compartment; a second member of said plurality of connector boxes providing a connection to switches in an instrument panel of said motor vehicle; the remaining members of said plurality of connector boxes being located at positions which are in different parts of said vehicle, individual ones of said remaining members of the boxes being positioned adjacent respective electrical circuits of said vehicle; and wherein said system further comprises a plurality of connectors for making connections with terminals of said boxes, and wherein members of a group of said plurality of connectors are connected to electrical equipment; whereby a minimum number of wires are employed in interconnecting the circuitry on one portion of said motor vehicle with the circuitry in another portion thereof, and whereby the wires conducting large current are arranged away from the vehicle's driver for optimum safety.

3. A wiring system for a motor vehicle having a battery in the front portion of an engine compartment, comprising:
a plurality of connector boxes each having therein a plurality of circuit elements and a plurality of bus bars, at least one of said bus bars providing branch conductive paths, selected members of said branched conductive paths being associated with said circuit elements and the remaining members of said branched conductive paths being adapted for outside connections; and a plurality of connectors each having at least one terminal; said remaining members of the branched conductive paths for outside connection being divided into a plurality of groups including first and second groups, members of the first group in each connector box being connected to the terminal of selected members of said connectors by wires in a one-to-one correspondence, and members of the second group in each connector box being connected to members of the second group in any one of the other connector boxes by wires in a one-to-one correspondence, each connector being connected to electrical equipment in said automotive vehicle; a first member of said plurality of connector boxes being positioned in the vicinity of said battery; said first group of the remaining members of branched conductive paths in said first member of the connector boxes being connected to one of the connectors, said one of the connectors being connected to said battery and providing a load circuit connection within said front portion of the engine compartment; and a second member of said connector boxes providing a connection to switches in an instrument panel of said motor vehicle; whereby a minimum number of wires are employed in interconnecting the circuitry on one portion of said motor vehicle with the circuitry in another portion thereof, and whereby the wires conducting large current are arranged away from the vehicle's driver for optimum safety.

* * * * *